United States Patent
Park et al.

(10) Patent No.: US 9,014,153 B2
(45) Date of Patent: Apr. 21, 2015

(54) METHOD FOR ENABLING A TERMINAL TO EFFICIENTLY DETECT AND SEARCH FOR A FEMTO BASE STATION

(75) Inventors: Sung Ho Park, Anyang-si (KR); Yong Ho Kim, Anyang-si (KR); Jin Lee, Anyang-si (KR); Bin Chul Ihm, Anyang-si (KR); Jin Young Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 335 days.

(21) Appl. No.: 13/139,204

(22) PCT Filed: Nov. 16, 2009

(86) PCT No.: PCT/KR2009/006706
§ 371 (c)(1),
(2), (4) Date: Jun. 10, 2011

(87) PCT Pub. No.: WO2010/067968
PCT Pub. Date: Jun. 17, 2010

(65) Prior Publication Data
US 2011/0243108 A1    Oct. 6, 2011

Related U.S. Application Data

(60) Provisional application No. 61/121,196, filed on Dec. 10, 2008, provisional application No. 61/144,412, filed on Jan. 13, 2009.

(30) Foreign Application Priority Data

May 14, 2009  (KR) .................. 10-2009-0042027
May 29, 2009  (KR) .................. 10-2009-0047562

(51) Int. Cl.
*H04W 48/20* (2009.01)
*H04W 48/16* (2009.01)

(52) U.S. Cl.
CPC .................................... *H04W 48/16* (2013.01)

(58) Field of Classification Search
USPC .................. 370/331, 328, 395, 210
See application file for complete search history.

(56) References Cited

U.S. PATENT DOCUMENTS 8,018,950 B2 *  9/2011  Wu et al. ............... 370/395.62
8,116,195 B2 *  2/2012  Hou et al. ............... 370/210
(Continued)

FOREIGN PATENT DOCUMENTS

KR  10-2009-0115030 A   11/2009
WO  WO 2008/051124 A1   5/2008

*Primary Examiner* — Kevin C Harper
*Assistant Examiner* — Derrick V Rose
(74) *Attorney, Agent, or Firm* — McKenna Long & Aldridge LLP

(57) ABSTRACT

A method for enabling a mobile station (MS) to efficiently detect and search for a femto base station is disclosed. The method comprises the steps of receiving a signal including information of a femto base station; and searching for the femto base station on the basis of the received information, wherein said received information is a sequence including at least one of the following: the entirety or a part of a femto base station ID (Identity), the entirety or a part of a cell ID, a sector ID, the entirety or a part of a CSG (Closed Subscriber Group) ID, and a frequency allocation index. In the step of receiving femto base station information, a preamble and data containing information on the femto base station are received. In the step of detecting the femto base station, the femto base station is separately detected on the basis of the received information. Here, the entirety or a part of the preamble sequence of the femto base station which is used for the separation of the femto base station is reused as a scrambling sequence for said data.

7 Claims, 8 Drawing Sheets

(56) References Cited

U.S. PATENT DOCUMENTS

| | | |
|---|---|---|
| 8,121,089 B2 * | 2/2012 | Bao et al. ............... 370/331 |
| 2007/0097938 A1 | 5/2007 | Nylander et al. |
| 2007/0270152 A1 | 11/2007 | Nylander et al. |
| 2009/0131098 A1 * | 5/2009 | Khandekar et al. ........... 455/525 |
| 2009/0135761 A1 * | 5/2009 | Khandekar et al. ........... 370/328 |

* cited by examiner

FIG. 3

| Preamble information(Pbits) | Turn on/off indicator (1bits) | CRC(8bits) |
|---|---|---|

(a)

| Short femto BS ID (N bits) | Turn on/off indicator (1bits) | CRC(8bits) |
|---|---|---|

(b)

FIG. 6
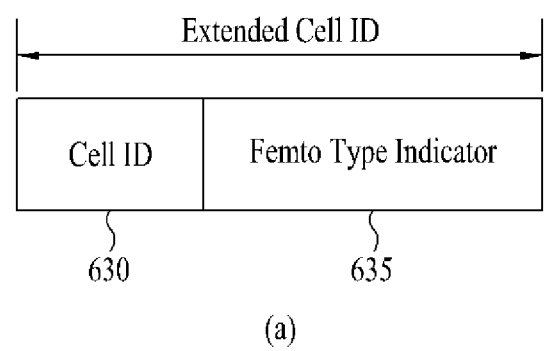
(a)
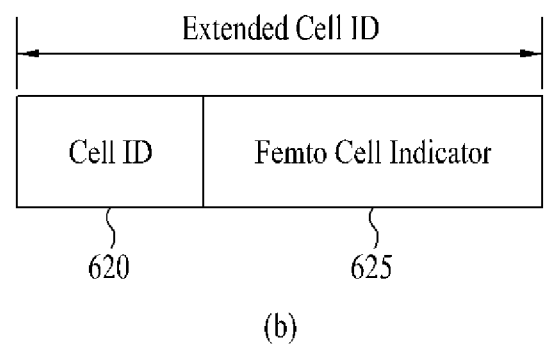
(b)
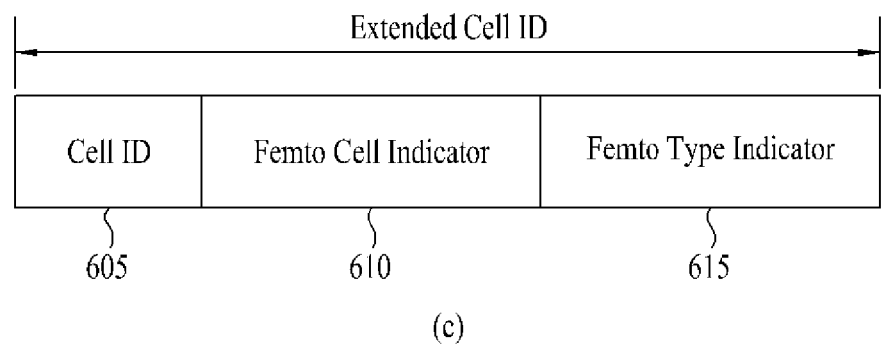
(c)

METHOD FOR ENABLING A TERMINAL TO EFFICIENTLY DETECT AND SEARCH FOR A FEMTO BASE STATION

This application is a 35 U.S.C. §371 National Stage entry of International Application No. PCT/KR2009/006706, filed on Nov. 16, 2009, and claims priority to U.S. Provisional Application Nos. 61/121,196, filed Dec. 10, 2008, and 61/144,412, filed Jan. 13, 2009, and Korean Application Nos. 10-2009-0042027, filed May 14, 2009 and 10-2009-0047562, filed May 29, 2009, each of which is hereby incorporated by reference in its entirety as if fully set forth herein.

TECHNICAL FIELD

The present invention relates to a femto cell, and more particularly, to a method for enabling a mobile station to detect and search for a femto base station.

BACKGROUND ART

A femto cell means an indoor base station for low power home use or office use. Although the femto cell is used as the same meaning as that of a pico cell, its function is more evolved than that of the pico cell. The femto cell is a small scaled cellular base station connected to a broadband router, and serves to connect audio and data of 3G as well as audio and data of 2G to a backbone network of a mobile communication provider through a digital subscriber link (DSL).

This femto cell has accelerated spread of 3G, and may be used as an initiator that increases indoor coverage. Also, it is expected that femto cell mobile station users will be increased to reach one hundred million people or more within several years and thirty million or more base stations will be provided. In view of technical aspect, indoor coverage enhancement of the technologies such as wideband code division multiple access (W-CDMA), high speed downlink packet access (HSDPA), evolution-data only (EVDO) is very important in providing services. As traffic is routing through IP network, network quality and receive capacity have been enhanced and at the same time operating cost invested by mobile communication providers for a backhaul dedicated line has been reduced. In this respect, the femto cell is very advantageous in view of strategic and economical aspects.

The femto cell is able to configure an independent network. Unlike the existing cells, the femto cell has a relatively small cell radius. FIG. 1 is a diagram illustrating a configuration of a femto cell. Referring to FIG. 1, a plurality of femto cells may exist in one macro cell. Supposing that a cell having a large radius is a macro cell in view of general aspect, the femto cell is a tiny cell that is connected with a general cell through backbone connection and performs communication by using its network capacity. The femto cell is different from a relay station (RS) in that the femto cell cannot be directly connected with another femto cell. Unlike the macro cell, this femto cell can be turned on/off, and can be operated in a sleep mode for power saving.

This femto cell can be divided into a closed subscriber group (CSG) and an open subscriber group (OSG) depending on features of an access terminal. Only an authorized mobile station can access the CSG femto cell, and all the mobile stations may access the OSG femto cell without any specific condition.

A legacy system is a system that follows the existing specification and corresponds to the related art system. For example, an institute of electrical and electronics engineers (IEEE) 802.16e system corresponds to the legacy system. However, the legacy system is not limited to the IEEE 802.16e system only. A new system more evolved than the existing system may be provided in a zone where the legacy system is provided.

There is provided a method for enabling a legacy system to scan a neighboring cell in a handover procedure. In case of the existing IEEE 802.16e system, a mobile station can receive neighboring cell information by requesting a base station of a scanning interval allocation request (MOB_SCN-REQ) message. Also, the base station may directly inform the mobile station of neighboring cell information by periodically transmitting a neighbor advertisement (MOB_NBR-ADV) message to the mobile station, whereby the mobile station can receive the neighboring cell information. However, when this neighboring cell search scheme is applied to femto cell search in the IEEE 802.16m system, several problems occur.

Unlike the existing macro cell, a femto cell newly introduced in the IEEE 802.16m may include many cells having similar power characteristics in case of similar frequency assignment. If many cells having similar power characteristics exist, the number of cells to be searched is increased, whereby overhead is increased. If the femto cells are operated at different FAs, the number of cells to be searched is more increased. Also, if the system supports a location based service (LBS), the number of femto cells to be searched can be limited to femto cells in the periphery of the mobile station. However, unless the LBS is supported, it is difficult to actually use the femto cells. Also, since the femto cell can be operated in an inactive mode unlike the existing macro cell, its list management is required.

An example of the femto cell search scheme according to the related art includes an inter-working signal (IWS) based femto cell search scheme. The femto cell is synchronized with the macro cell, and can transmit the IWS to the macro cell base station for FA of the macro cell. At this time, the femto base stations that use the same FA can transmit the IWS to the macro cell base station by using the same resource, while the femto base station that use their respective FA can transmit the IWS to the macro cell base station by using different resources. Afterwards, the mobile station can obtain information on neighboring femto cells by receiving and detecting the IWS from the macro cell base station while performing communication with the macro cell base station. In other words, the mobile station can detect the femto cell even without separate scanning for different FAs.

FIG. 2 is a diagram illustrating an example of an IWS transmitted from a femto cell base station to a macro cell base station during femto cell search according to the related art.

Referring to FIG. 2, as suggested, the IWS has coverage similar to that of a broadcast channel (BCH), and a resource allocation scheme is the same as illustrated in FIG. 2. For example, femto cells for two FAs can simultaneously be detected through a preamble signal divided by a frequency division multiplexing (FDM) mode at a system bandwidth of 5 MHz. At this time, a total of 288 data tones can be used.

FIG. 3 is a diagram illustrating examples of a type of an IWS transmitted from a femto base station to a macro cell base station.

A problem occurs in that it is difficult to identify a femto cell through preamble information only, which includes information such as cell index, from the IWS type illustrated in (a) of FIG. 3. A mobile station (MS) needs layer 2 (L2) information, which is media access control (MAC) information, from the femto base station before initiating handover (HO) or deciding to wake up the femto base station.

On the other hand, since femto base station ID is unique at the IWS type illustrated in (b) of FIG. 3, the mobile station (MS) doe not need L2 information from the femto base station before initiating handover (HO) or deciding to wake up the femto base station. However, since short femto base station ID is only a part of femto base station ID, a problem occurs in that it is difficult to detect the short femto base station ID once and that the short femto base station ID should be searched again.

In the aforementioned femto cell search scheme according to the related art, since pilot tones are divided into two types as illustrated in FIG. 2, two FAs or two femto base station IDs have been searched once. For this reason, a problem occurs in that the number of femto base stations is increased. Also, if the mobile station directly searches for the femto base station, a problem occurs in that much time is required to search for the femto base station.

A synchronization channel is used for physical synchronization or used to identify segment information and base station ID. In case of the IEEE 802.16e system, these two uses of the synchronization channel have been achieved using a preamble of one symbol. In case of the IEEE 802.16m system, these two uses of the synchronization channel have been achieved respectively by a primary synchronization channel (P-SCH) for physical synchronization and a secondary synchronization channel (S-SCH) for segment information and base station ID.

For example, if the synchronization channel is used for segment information and base station ID, three segments of $3k, 3k+1, 3k+2$ ($k=0, 1, 2, \ldots, N-1, 3(N-1)=2$ is smaller than or equal to the number of used subcarriers) are defined in a subcarrier unit, wherein base station ID can be identified by a code division multiplexing (CDM) mode using N number of orthogonal sequences per segment. In this case, segments may represent three sector IDs in case of three sectors.

DISCLOSURE

Technical Problem

Accordingly, the present invention is directed to a method for enabling a mobile station to detect and search for a femto base station, which substantially obviates one or more problems due to limitations and disadvantages of the related art.

An object of the present invention is to provide a method for enabling a mobile station to efficiently detect and search for a femto base station by using a signal supported by the femto base station.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for enabling a mobile station to efficiently detect and searching for a femto base station comprises receiving a signal including information on the femto base station; and searching for the femto base station based on the received information, wherein the received information is a sequence including at least one of the entirety or a part of a femto base station ID (Identity), the entirety or a part of a cell ID, a sector ID, the entirety or a part of a closed subscriber group (CSG) ID, and a frequency allocation index.

Preferably, the sequence includes at least one of a status indicator indicating whether a femto cell is active and a femto type indicator indicating open subscriber group (OSG) type or CSG type.

Also, the sequence further includes a femto type indicator when the CSG ID is included in the sequence.

Also, the sequence further includes at least any one of a femto cell indicator indicating a macro cell or a femto cell and a femto type indicator when the cell ID is included in the sequence.

Also, the received signal further includes a message, and the message further includes at least one of the cell ID, a femto cell status indicator, a frequency allocation index for frequency allocation (FA) to which the femto cell belongs, and cyclic redundancy check (CRC).

Also, a part of the CSG ID is preferably included in the message when the CSG ID is included in the sequence.

Preferably, the sequence is used as a scrambling code.

Also, a resource region (or zone) of a downlink for transmitting information of the femto base station is preferably allocated by any one of FDM mode, CDM mode and TDM mode for the frequency allocation index or sector index.

Also, a multiplexing mode applied to the message included in the received signal is different from that applied to a preamble sequence.

In another aspect of the present invention, a method of searching for a femto base station comprises receiving a preamble including identification information of the femto base station and data; and searching for the femto base station by identifying the femto base station based on the received information, wherein the entirety or a part of the preamble sequence of the femto base station, which is used for identification of the femto base station, are reused as a scrambling sequence of the data.

In other aspect of the present invention, a method for searching for a femto base station comprises receiving a preamble including information of the femto base station and data; and processing the data by indentifying the femto base station based on the received information, wherein a sequence allocated to the femto base station is sequentially allocated to the preamble and data.

Advantageous Effects

The method for detecting and searching for a femto base station according to the present invention is advantageous in that data can be scrambled effectively with small memory capacity, and the femto base station can be detected efficiently.

It will be appreciated by persons skilled in the art that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a diagram illustrating examples of a type of an IWS transmitted from a femto base station to a macro cell base station;

FIG. 6 is a diagram illustrating extended cell ID formats in accordance with the preferred embodiment of the present invention;

BEST MODE FOR CARRYING OUT THE INVENTION

Figure 1:
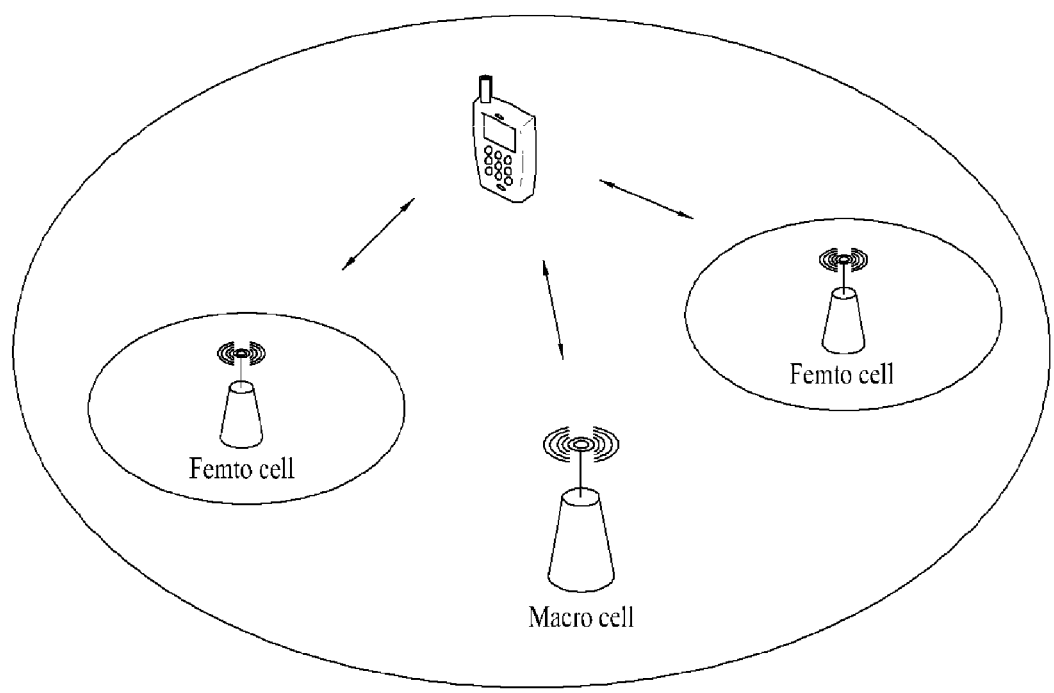
FIG. 1 is a diagram illustrating a configuration of a femto cell.
Figure 2:
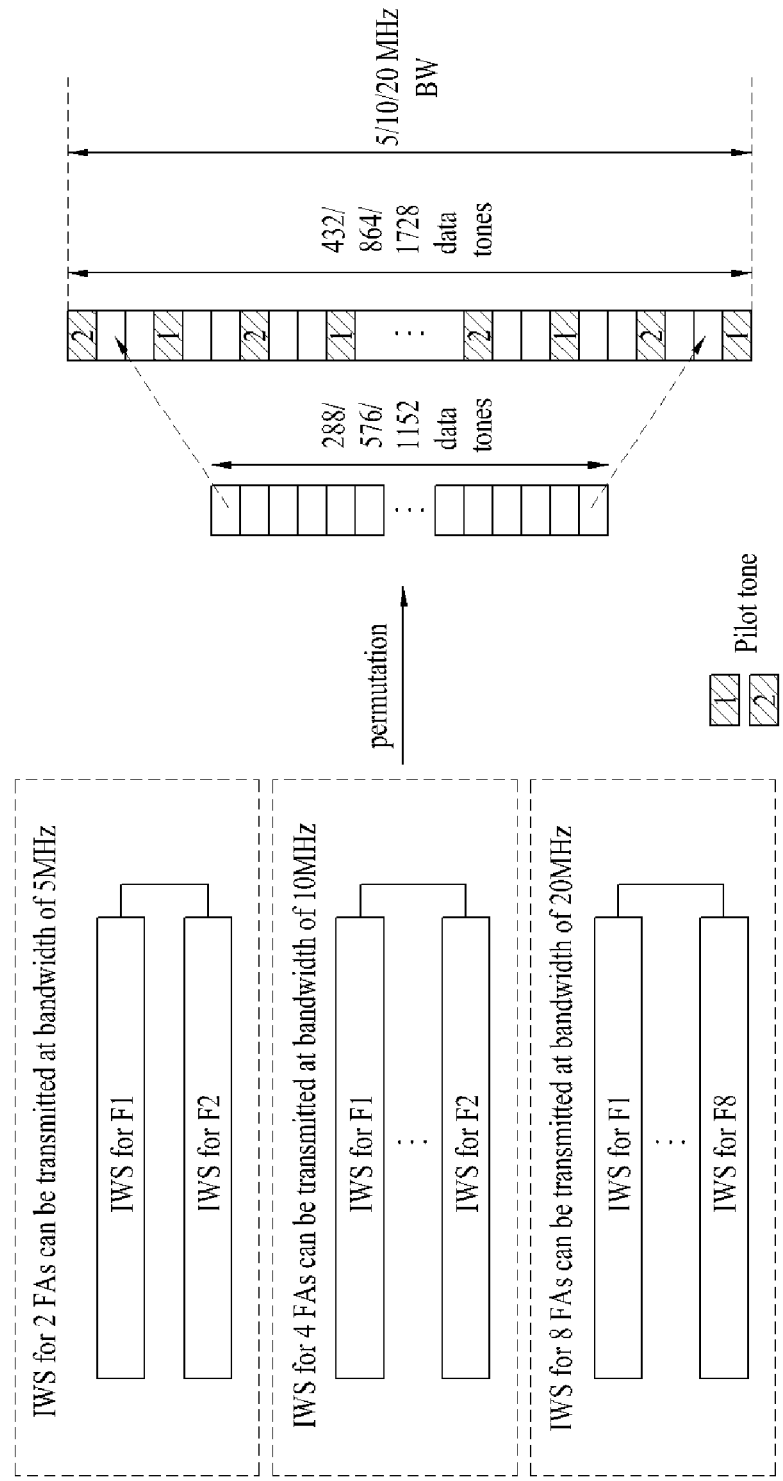
FIG. 2 is a diagram illustrating an example of an IWS transmitted from a femto cell base station to a macro cell base station during femto cell search according to the related art.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, the following description will be made based on, but not limited to, some terminologies. And, other random terminologies may be designated to refer to the same meaning. Wherever possible, the same reference numbers will be used throughout the drawings to refer to the same or like parts.

In the description, when some part "includes" some element, unless specified otherwise, it means that the corresponding part may further include any other element.

The technology disclosed hereinafter can be used for various communication systems that can provide various communication services such as voice and packet data. The technology of the communication system can be used in a downlink or uplink. A base station may be replaced with terms such as a fixed station, Node B, eNode B (eNB), access point, and ABS. Also, a mobile station (MS) may be replaced with terms such as a user equipment (UE), a subscriber station (SS), a mobile subscriber station (MSS), AMS, and a mobile terminal.

Furthermore, a transmitting side means a node that transmits data services or voice services while a receiving side means a node that receives data services or voice services. Accordingly, in the uplink, the mobile station could be a transmitting side while the base station could be a receiving side. Likewise, in the downlink, the mobile station could be a receiving side while the base station could be a transmitting side.

Meanwhile, in the present invention, examples of the mobile station include a personal digital assistant (PDA), a cellular phone, a personal communication service (PCS) phone, a global system for mobile (GSM) phone, a wideband CDMA (WCDMA) phone, and a mobile broadband system (MBS) phone.

The embodiments of the present invention can be supported by standard documents disclosed in at least one of wireless access systems, i.e., IEEE 802 system, 3GPP system, 3GPP LTE system, and 3GPP2 system. Namely, among the embodiments of the present invention, steps or parts which are not described to clarify technical spirits of the present invention can be supported by the above standard documents. Also, all terminologies disclosed herein can be described by the above standard documents.

Particularly, the embodiments of the present invention can be supported by one or more of standard documents of the IEEE 802.16 system, i.e., P802.16-2004, P802.16e-2005 and P802.16Rev2.

Specific terminologies hereinafter used in the embodiments of the present invention are provided to assist understanding of the present invention, and various modifications can be made in the specific terminologies within the range that they do not depart from technical spirits of the present invention.

A femto base station can be differentiated from a macro cell by a frequency division multiplexing (FDM), time division multiplexing (TDM), and code division multiplexing (CDM). In other words, the femto base station can be differentiated from the macro cell by applying frequency differently or by a time domain. Also, the femto base station can be differentiated from the macro cell by applying different codes or sequences to the same zone. If two signals of the femto base station and the macro base station are differentiated from each other, the femto base station and the macro base station may coexist. Also, the respective femto base stations can be differentiated from each other by FDM, TDM and CDM as described above.

In the mean time, the femto base station is not always powered "on" or in "active" state. In other words, the femto base station may be in power "on" or "off" state. Also, since many femto base stations may exist in the macro cell, the mobile station cannot always recognize the presence of all the femto cells. Accordingly, if the femto base station transmits a periodic signal to the macro base station, the mobile station in the macro base station can recognize the presence of the femto cell by reading the signal.

Figure 4:
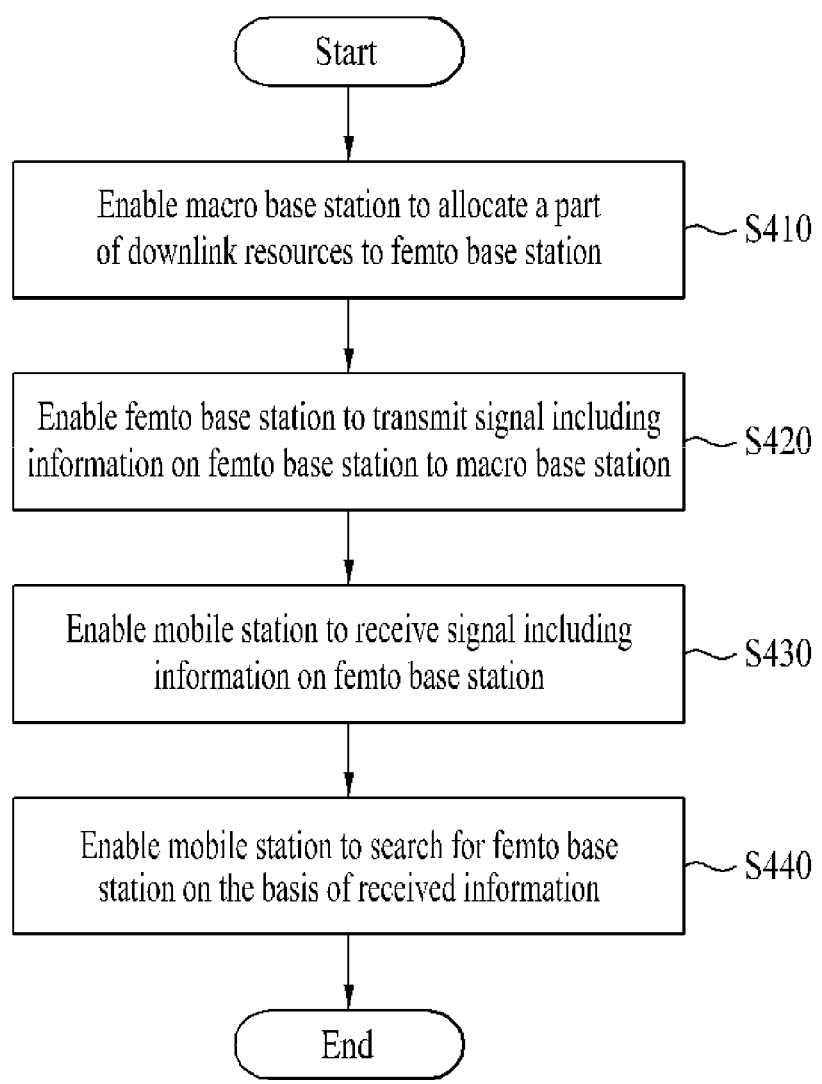
FIG. 4 is a flow chart illustrating a procedure of a method for enabling a mobile station to efficiently search for a femto base station in accordance with the preferred embodiment of the present invention.

FIG. 4 is a flow chart illustrating a procedure of a method for enabling a mobile station to efficiently search for a femto base station in accordance with the preferred embodiment of the present invention.

Referring to FIG. 4, the macro base station may allocate a part of a downlink resource (time or frequency) to the femto base station (S410). At this time, resource allocation can be performed periodically or non-periodically. Before the macro base station allocates a resource to the femto base station, consent or agreement as to when a resource is allocated is made in advance between the macro base station and the femto base station if resource allocation is non-periodical, and the mobile station knows this fact in advance. In other words, resource allocation of the macro base station to the femto base station is performed by agreement between the femto base station and the macro base station or notification of the macro base station to the femto base station.

Afterwards, the femto base station may transmit a signal of information indicating its presence to the macro base station (S420). In other words, the femto base station transmits information, which can notify its presence in the allocated resource zone. Afterwards, the mobile station may receive a signal, which includes information of the femto base station, from the macro base station (S430). Then, the mobile station may search for the femto base station based on the received signal information (S440).

Hereinafter, two types of information notifying the macro base station of the presence of the femto base station will be described in detail.

Information broadcasted to the macro base station is configured through two formats. In other words, the femto base station transmits a preamble (or pilot) only to the macro base station, or transmits a preamble combined with a message (pilot combined with data) to the macro base station.

In one embodiment according to the present invention, a case where the femto base station transmits a preamble only to the macro base station will be described. The preamble can be comprised of a sequence for identifying the femto base station or specific information. In other words, the femto base station can transmit a sequence indicating combination of information, such as frequency allocation, base station ID, CSG ID and sector ID, to the macro base station as a preamble.

Figure 5:
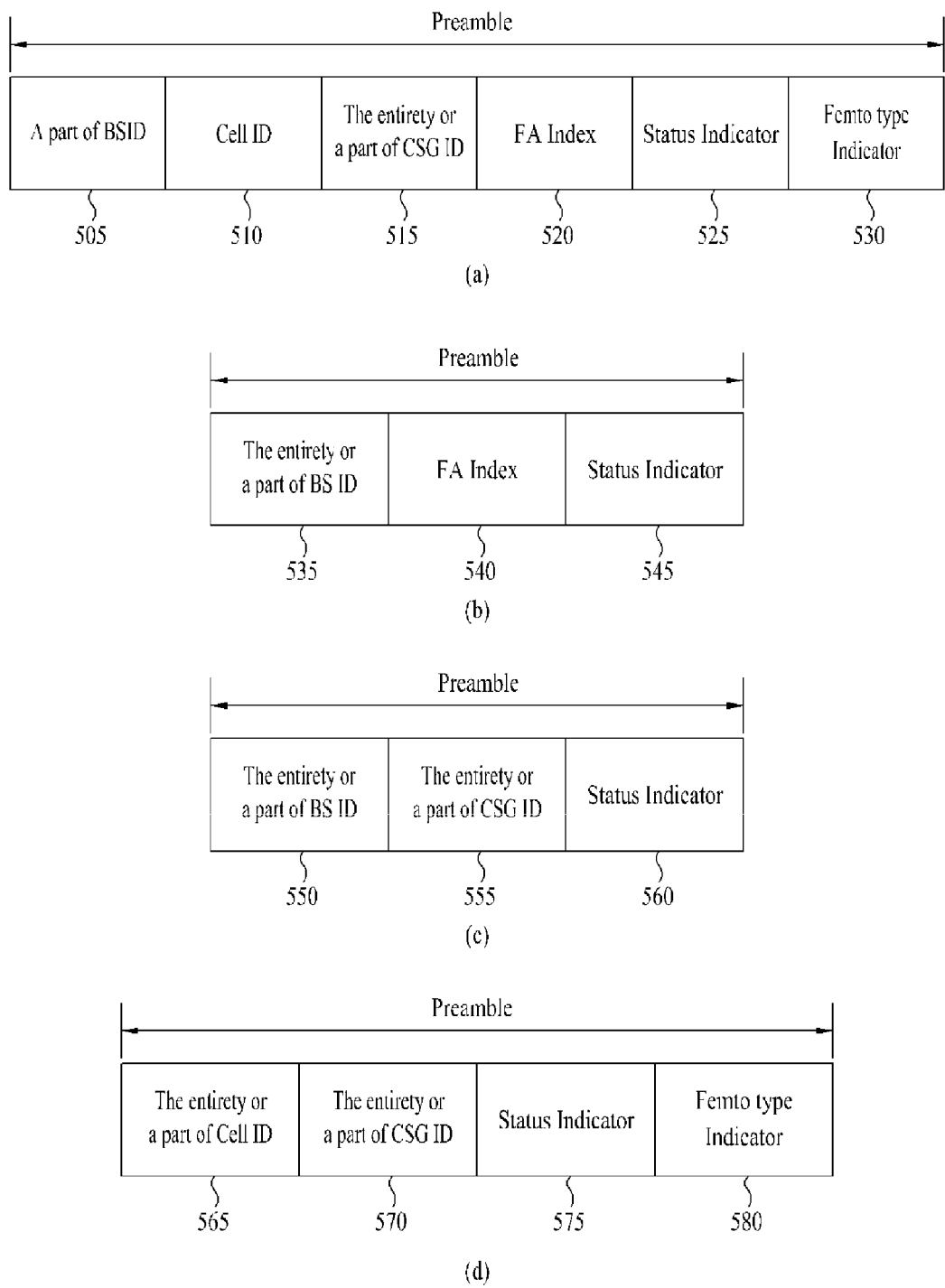
FIG. 5 is a diagram illustrating a configuration of a preamble transmitted from a femto base station to a macro base station in accordance with the preferred embodiment of the present invention.

FIG. 5 is a diagram illustrating a configuration of a preamble transmitted from a femto base station to a macro base station in accordance with the preferred embodiment of the present invention.

Referring to (a) of FIG. 5, the preamble may include the entirety or a part of a base station ID 505, the entirety or a part of a cell ID 510, the entirety or a part of a CSG ID 515, a frequency allocation index 520, a status indicator 525, and a femto type indicator 530. In other words, any one of the entirety or a part of the base station ID 505, the entirety or a part of the cell ID 510, the entirety or a part of the CSG ID 515, the frequency allocation index 520, the status indicator 525, and the femto type indicator 530 may be configured as the preamble, or a sequence configured by combining each of the entirety or a part of the base station ID 505, the entirety or a part of the cell ID 510, the entirety or a part of the CSG ID 515, the frequency allocation index 520, the status indicator 525, and the femto type indicator 530 may be configured as the preamble.

Referring to (b) of FIG. 5, a sequence configured by combining the entirety or a part of a base station ID 535, a frequency allocation (FA) index 540, and a status indicator 545 may be configured as the preamble.

Also, referring to (c) of FIG. 5, a sequence configured by combining the entirety or a part of a base station ID 550, the entirety or a part of a CSG ID 550, and a status indicator 560 may be configured as the preamble.

Also, referring to (d) of FIG. 5, a sequence configured by combining the entirety or a part of a cell ID 565, the entirety or a part of a CSG ID 570, a status indicator 575 and a femto type indicator 580 may be configured as the preamble.

The preambles illustrated in (a) to (d) of FIG. 5 are only a part of combination examples, and various combinations can be made in the preamble by the present invention.

The femto base station may transmit the entirety or a part of the base station ID of the femto base station to the macro base station. The base station ID can be used effectively if the mobile station knows ID of the femto base station that can be accessed. Also, the femto base station can selectively transmit femto cell ID to the macro base station. At this time, a sector cell ID may be included in the femto cell ID, or may not be included in the femto cell ID. The femto cell ID corresponds to ID that determines a sequence used as a synchronization channel by the femto base station.

Also, the femto base station may selectively transmit the entirety or a part of the CSG ID to the macro base station. This CSG ID can be used effectively if the mobile station knows the CSG ID.

Also, the femto base station may selectively transmit the frequency allocation index to the macro base station. If this frequency allocation index is transmitted, the mobile station can detect frequency allocation (FA) used by the femto base station.

As described above, the femto base station may separately transmit the femto base station ID, the femto cell ID, the CSG ID, and the sector ID to the macro base station. Also, the femto base station may transmit a sequence configured by combining the femto base station ID, the femto cell ID, the CSG ID, and the sector ID to the macro base station as the preamble. Also, the femto base station may transmit the sequence additionally combined with a status indicator indicating active/inactive status and a femto type indicator indicating OSG type or CSG type, to the macro base station.

For example, it is assumed that the base station ID is 48 bits and bits that can be transmitted from the femto base station to the macro base station are 18 bits. In this case, the femto base station may transmit 18 bits of 48 bits indicating the base station ID to the macro base station. As another option, the femto base station may transmit a total of 18 bits by transmitting 16 bits of 48 bits indicating the base station ID and 2 bits of bits indicating frequency allocation index. As other option, the femto base station may transmit a total of 18 bits by transmitting 14 bits of 48 bits indicating the base station ID, 3 bits of bits indicating frequency allocation index and status indicator of 1 bit. This is illustrated in Table 1. Table 1 illustrates an example of the base station ID. Instead of the base station ID, cell ID or CSG ID may be used.

TABLE 1

| | |
|---|---|
| Format 1 | A part (18 bits) of base station ID |
| Format 2 | A part (16 bits) of base station ID + frequency allocation index (2 bits) |
| Format 3 | A part (14 bits) of base station ID + frequency allocation index (3 bits) + status indicator (1 bit) |

In the mean time, the femto base station can use the CSG ID as the preamble. At this time, the mobile station can search for the CSG femto cell but cannot know the OSG femto cell. Accordingly, it is more preferable that the femto base station transmits the CSG ID combined with the femto type indicator than that the femto base station transmits the CSG ID only.

According to another embodiment of the present invention, the femto base station may use the CSG ID combined with the femto type indicator as the preamble. At this time, if the mobile station fails to search for the CSG femto cell, it starts to detect the OSG femto cell in accordance with the femto type indicator. Afterwards, if the OSG femto cell is detected, the mobile station can search for OSG femto base stations. In this case, if the existing macro cell ID is applied, a problem occurs in that there are many OSG femto base stations to be searched by the mobile station. In order to solve this problem, according to the present invention, cell ID is independently allocated to the femto base station, whereby the number of OSG femto cells to be searched can be restricted. In other words, a part of all cell IDs may be allocated for the femto base station, or all cell IDs may be divided into cell IDs for OSG femto base station and cell IDs for CSG femto base station.

For example, 10 bits can be used for cell IDs. At this time, the cell IDs 0~50 can be allocated to the femto cell, and the cell IDs 51~1023 can be allocated to the macro cell. Selectively, the cell IDs 0~50 can be allocated for the OSG femto cell, the cell IDs 51~100 can be allocated for the CSG femto cell, and the other cell IDs 101~1023 can be allocated for the macro cell.

As another option, extended cell ID may be defined in such a manner that a femto cell indicator indicating a femto cell or a macro cell is added to the existing cell ID or a femto type indicator indicating the OSG type or the CSG type is added to the existing cell ID. In other words, the extended cell ID may be considered as one of three types expressed in Table 2. Table 2 illustrates formats of the extended cell ID.

TABLE 2

| Format 1 | Femto cell indicator + cell ID |
| Format 2 | Femto cell indicator + femto type indicator + cell ID |
| Format 3 | Femto cell indicator + femto type indicator + cell ID |

FIG. 6 is a diagram illustrating extended cell ID formats in accordance with the preferred embodiment of the present invention.

Referring to (a) of FIG. 6, the extended cell ID format may further include a femto cell indicator 610 and a femto type indicator 615 in addition to the existing cell ID 605. Also, as illustrated in (b) of FIG. 6, the extended cell ID format may further include a femto cell indicator 625 only in addition to the existing cell ID 620. Moreover, as illustrated in (c) of FIG. 6, the extended cell ID format may further include a femto type indicator 635 only in addition to the existing cell ID 630.

When the femto base station transmits information to the macro base station, it is preferable that the femto base station transmits preamble information, which can reduce the number of lower targets to be searched by the mobile station to the maximum range. At this time, it is preferable that examples of the targets to be searched by the mobile station include the entirety or a part of the base station ID, the entirety or a part of the CSG ID, and the entirety or a part of the cell ID. The preamble information can be divided into CDM, FDM and TDM depending on an allocation mode. The macro base station can allocate a resource region (or zone) of a downlink, which transmits information of the femto base station, in accordance with any one of the FDM, the CDM and the TDM for frequency allocation index or sector index.

For example, a part of a subframe #k1 can be allocated for the femto base station, which uses FA #n1, and a part of a subframe #k2 can be allocated for the femto base station, which uses FA #n2. This will be illustrated in Table 3 below.

TABLE 3

Preamble sequence #0 for CSG ID #0Preamble sequence #1 for CSG ID #1Preamble sequence #2 for CSG ID #2 . . . Preamble sequence #L-2 for CSG ID #L-2Preamble sequence #L-1 for Open Femto BS As described above, the mobile station searches for the femto base station by respectively detecting the entirety or a part of the base station ID, the entirety or a part of the cell ID, the entirety or a part of the CSG ID, and frequency allocation index, or detecting the sequence mapped by combining the entirety or a part of the base station ID, the entirety or a part of the cell ID, the entirety or a part of the CSG ID, and frequency allocation index with one another.

As another embodiment of the present invention, a case where the femto base station may transmit a message to the macro base station together with a preamble will be described. In this case, after the preamble is used in the same manner as the case where the femto base station may transmit a preamble only to the macro base station, it is again used for channel estimation to decode the message. At this time, the other information which is not transmitted through the preamble may be carried in the message, or the message may be transmitted to again identify the information transmitted through the preamble. Also, cyclic redundancy check (CRC) may be prefixed to the message to check a decoding error. At this time, overhead of too many resources is required to uniquely identify the preamble. Accordingly, the message does not need to be transmitted to uniquely identify the preamble.

Figure 7:
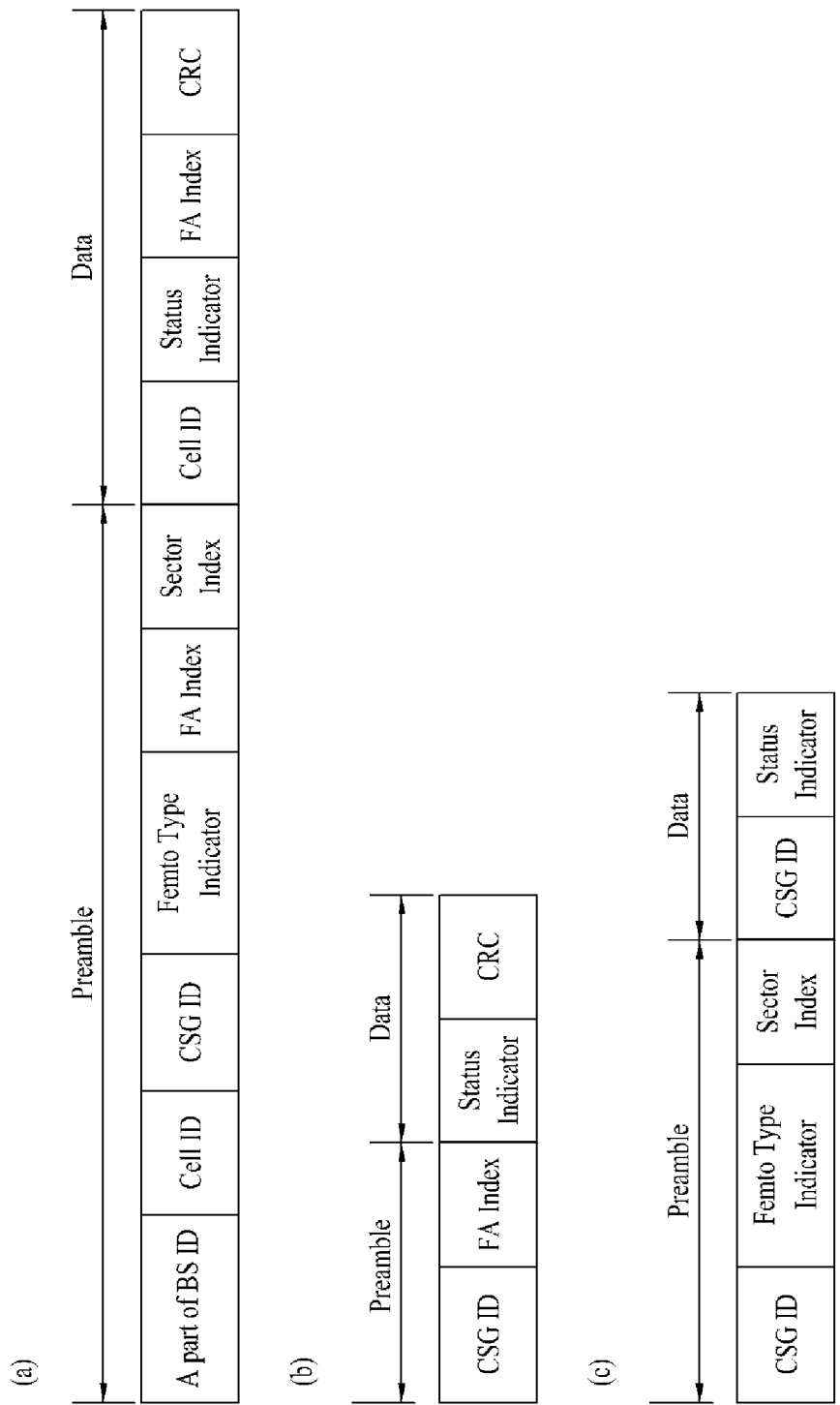
FIG. 7 is a diagram illustrating examples of a preamble and data transmitted from a femto base station to a macro base station in accordance with the preferred embodiment of the present invention.

FIG. 7 is a diagram illustrating examples of a preamble and data transmitted from a femto base station to a macro base station in accordance with the preferred embodiment of the present invention.

Referring to (a) of FIG. 7, the preamble region (or zone) includes the entirety or a part of a base station ID 705, a cell ID 710, a CSG ID 715, a femto type indicator 720, a frequency allocation index 725, and a sector index 730. Meanwhile, the data may include a cell ID 735, a status indicator 740, a frequency allocation index 745, and a CRC 750. At this time, the preamble zone may be configured by the entirety or a part of the base station ID 705, the cell ID 710, the CSG ID 715, the femto type indicator 720, the frequency allocation index 725, and the sector index 730 520 independently or in combination. Also, the data zone may be configured by the cell ID 735, the status indicator 740, the frequency allocation index 745, and the CRC 750 independently or in combination.

Referring to (b) of FIG. 7, the preamble zone can be configured by a sequence configured by combining a CSG ID 755 with a frequency allocation index 760, and the data zone can be configured by a sequence configured by combining a status indicator 765 with a CRC 770.

Referring to (c) of FIG. 7, the preamble zone can be configured by a sequence configured by combining a CSG ID 775, a femto type indicator 780 and a sector index 785 with one another, and the data region may include the other CSG ID 790 of the CSG ID, which is not carried in the preamble, and a status indicator 795.

As described above, the femto base station can transmit additional information, which can reduce search targets, through the message, in addition to the information transmitted through the preamble. Examples of information that can be transmitted through the preamble and the message may include a CSG ID, a base station ID, a cell ID, a sector ID, a frequency allocation index, a femto type indicator, and a status indicator. A part or combination of these kinds of information can be transmitted through the preamble and the message.

At this time, if the preamble and the message are transmitted together, information, which can efficiently identify the respective cells from each other using a relatively shorter length than the case where the preamble is only transmitted, is preferably used as the preamble. Accordingly, the information is preferably selected from the CSG ID, the CSG ID combined with the femto type indicator, a part of the base station ID, the cell ID, the frequency allocation index, and the sector index. The number of femto cells subjected to search targets restricted using the preamble can be more reduced through additional information of the data zone. Examples of the information that can be transmitted through the data region include a cell ID, a status indicator indicating that a corresponding femto cell is active or inactive, a frequency allocation index for FA to which the corresponding femto cell belongs, and CRC information on transmission data. If information such as CSG ID to be transmitted through the preamble is sufficiently long, a part of the information may be transmitted by being carried in the data zone.

In the same manner as the case where the preamble is only transmitted, the macro base station can allocate a resource zone of a downlink, which transmits information of the femto base station, in accordance with any one of the FDM, the CDM and the TDM for frequency allocation index or sector index.

For example, a part of a subframe #k1 can be allocated for the femto base station, which uses FA #n1, and a part of a subframe #k2 can be allocated for the femto base station, which uses FA #n2.

Also, if several femto base stations transmit the preamble and the message at the same time, they can share a downlink resource allocated from the macro base station in accordance with a CDM, FDM or hybrid mode. At this time, the sequence used for the preamble can be used again as a scrambling code. Also, the preamble and the message may be transmitted in accordance with their respective multiplexing mode.

The following Tables 4 and 5 respectively illustrate that the message is transmitted together with the preamble.

TABLE 4

Preamble sequence #0 for CSG ID LSB M1 bits
(0 . . . 000)Preamble sequence #1 for CSG ID LSB M1 bits
(0 . . . 001)Preamble sequence #2 for CSG ID LSB M1 bits
(0 . . . 010) . . . Preamble sequence #2M1-1 for CSG ID LSB
M1 bits (1 . . . 111)Preamble sequence #2M1-1+1 for Open 필도 BSMessage
includes "CSG ID MSB M2 bits + Cell ID + Sector ID + FA index +
Active/Inactive + CRC"

TABLE 5

Preamble sequence #0 for BS ID LSB M1 bits (0 . . . 000)Preamble
sequence
1 for BS ID LSB M1 bits (0 . . . 001)Preamble sequence #2 for BS ID LSB
M1 bits (0 . . . 010) . . . Preamble sequence #2M1-1 for BS ID LSB M1 bits
(1 . . . 111)Message includes BS ID MSB M2 bits + Active/Inactive +
FA index + CRC"

In the method for enabling a mobile station (MS) to search for a femto base station in accordance with the present invention, the number of femto cells to be searched by the MS is more reduced than the method for searching for a femto base station according to the related art, whereby efficient search can be performed. In other words, according to the present invention, the mobile station can quickly and exactly search for the femto base station by detecting the mapped sequence on the basis of a signal supported by the femto base station without full searching for all femto base stations.

Hereinafter, the method for searching for a femto base station will be described in more detail.

A synchronization channel (SCH) is used for physical synchronization or is used to identify segment information and base station ID. In case of the IEEE 802.16e system, these two uses of the synchronization channel have been achieved using a preamble of one symbol. In case of the IEEE 802.16m system, these two uses of the synchronization channel have been achieved respectively by a primary synchronization channel (P-SCH) for physical synchronization and a secondary synchronization channel (S-SCH) for segment information and base station ID.

For example, if the synchronization channel is used for segment information and base station ID, three segments of 3k, 3k+1, 3k+2 (k=0, 1, 2, . . . , N−1, 3(N−1)=2 is smaller than or equal to the number of used subcarriers) are defined in a subcarrier unit, wherein base station ID can be identified by a code division multiplexing (CDM) mode using N number of orthogonal sequences per segment. In this case, segments may represent three sector IDs in case of three sectors.

In the present invention, the base station can be used to include a cell or sector.

The femto base station can be differentiated from the macro cell by any one of frequency division multiplexing (FDM), time division multiplexing (TDM), and code division multiplexing (CDM). In other words, the femto base station can be differentiated from the macro cell by applying frequency differently or by a time domain. Also, the femto base station can be differentiated from the macro cell by applying different codes or sequences to the same zone. If two signals of the femto base station and the macro base station are differentiated from each other, the femto base station and the macro base station may coexist. Also, the respective femto base stations can be differentiated from each other by any one of FDM, TDM and CDM as described above.

The femto base station is not always powered "on" or in "active" state. In other words, the femto base station may be in power "on" or "off" state. Also, since many femto base stations may exist in the macro cell, the mobile station cannot always recognize the presence of all the femto cells. Accordingly, if the femto base station transmits a periodic signal to the macro base station, the mobile station in the macro base station can recognize the presence of the femto cell by reading the signal.

Hereinafter, two types of information notifying the macro base station of the presence of the femto base station will be described in detail.

Information broadcasted from the femto base station to the macro base station is configured through two formats. In other words, the femto base station transmits a preamble (or pilot) only to the macro base station, or transmits a preamble combined with a message (pilot combined with data) to the macro base station.

First of all, in case of the former case, the femto base station transmits a preamble only to the macro base station. The preamble can be comprised of a sequence for identifying the femto base station or specific information. In other words, the femto base station can transmit a sequence indicating combination of information, such as frequency allocation (FA), base station ID, closed subscriber group (CSG) ID and sector ID, to the macro base station as a preamble.

In case of the latter case, the femto base station transmits a message to the macro base station together with a preamble. In this case, after the preamble is used in the same manner as the case where the femto base station transmits a preamble only to the macro base station, it is again used for channel estimation to decode the message. At this time, the other information which is not transmitted through the preamble may be carried in the message, or the message may be transmitted to again identify the information transmitted through the preamble. Also, cyclic redundancy check (CRC) may be prefixed to the message to check a decoding error. At this time, although it is preferably required to uniquely identify the preamble, overhead of too many resources is required to uniquely identify the preamble. Accordingly, the message does not need to be transmitted to uniquely identify the preamble.

Hereinafter, in the case where the preamble corresponding to the latter case is transmitted together with the message, a method for reusing the sequence applied to the preamble as a data scrambling code will be described.

In order to identify each preamble (for example, to identify cell or sector), one or more sequences of K number of codes/ sequences can generally be allocated to the preamble. At this time, the sequence the same as that of the corresponding preamble can be used for data for scrambling. If the length of the preamble is different from that of the data, the length can be reduced in such a manner that it is truncated, or the length can be extended in such a manner that repetition can be applied to the length. Hereinafter, supposing that the length of a preamble sequence P is N and the length of data D is M, three cases are considered as follows.

P=$\{p_1, p_2, \ldots, p_N\}$, (P: preamble sequence, n: sequence index)

D=$\{d_1, d_2, \ldots, d_M\}$, (D: data, m: data index)

1. N>M is Considered.

If the length of the preamble sequence is greater than that of the data, a part of the preamble sequence can be used as a data scrambling sequence. In this case, the preamble sequence can be configured by LSB (Least Significant Bit) (M)= $\{p_1, p_2, \ldots, p_M\}$ and MSB (Most Significant Bit) $\{P_{N-M+1}, p_{N-M+2}, \ldots, p_N\}$. At this time, in case of N=i×M, the preamble sequence can be configured by extraction of interval i. For example, if N=2M and M is an odd number, the preamble sequence can be configured such as $\{p_1, p_3, \ldots, p_{N-1}\}$. Unlike this, if M is an even number, the preamble sequence can be configured such as $\{p_1, p_3, \ldots, p_N\}$.

2. N=M is Considered.

If the length of the preamble sequence is the same as that of the data, the preamble sequence can be used as a data scrambling sequence. However, sequence elements may be configured by the same order, or cyclic shift may be applied to the sequence elements within the corresponding length. At this time, a cyclic shift value V can be allocated in accordance with a method previously agreed with the macro base station.

For example, it is supposed that m=(n+v) mod N (mod: modulo operation). At this time, if cyclic shift index of 0 is applied, the preamble sequence P=$\{p_1, p_2, \ldots, p_N\}$ can be applied to data D=$\{d_1, d_2, \ldots, d_M\}$. Also, if cyclic shift index of 2 is applied, the preamble sequence P=$\{p_3, p_4, \ldots, p_{N+2}\}$ can be applied to data D=$\{d_1, d_2, \ldots, d_M\}$.

3. N<M is Considered.

In this case, the length of the preamble sequence is shorter than that of the data. Supposing that M=I×N (wherein I is an integer), the sequence of the preamble can be applied repeatedly (i=0, …, I−1).

First of all, the case where all preamble sequences are configured repeatedly will be described.

Scrambling sequences of data may be those obtained by repeatedly applying all sequences of the preamble to which cyclic shift is applied, as much as I times. For example, the scrambling sequences of data may be those obtained by repeatedly applying all sequences of the preamble to which a cyclic shift value 0 of cyclic shift version is applied, as much as I times (P=$\{p_1, p_2, \ldots, p_N, \ldots, p_1, p_2, \ldots, p_N\}$). For another example, the scrambling sequences of data may be those obtained by repeatedly applying all sequences of the preamble to which a cyclic shift value 2 of cyclic shift version is applied, as much as I times (P=$\{p_3, p_4, \ldots, p_{N-2}, \ldots, p_3, p_4, \ldots, p_{N-2}\}$).

Next, the case where preamble sequences are repeatedly allocated per sequence element will be described. Data scrambling sequences can be configured by applying cyclic shift to the sequence of the preamble and repeating the preamble sequence per sequence element. For example, the data scrambling sequences may be configured by applying a cyclic shift value 0 to the preamble sequence and repeatedly applying the preamble sequence per sequence element (P= $\{p_1, p_2, \ldots p_N, p_N\}$). For another example, the preamble sequence of (P=$\{p_3, p_4, \ldots, p_{N-2}, p_{N-2}\}$) can be configured by using a cyclic shift value 2. The preamble sequence may be used as the data scrambling sequence.

Now, it is supposed that M=I×N+J (wherein, I and J are integers, respectively). In this case, repeated allocation is applied to I as much as I like M=I*N. Afterwards, allocation like N>M is applied to J.

In the aforementioned cases, if the allocated cyclic shift value is one, the sequence applied for repeated allocation can be configured by combination of the sequence to which a basic cyclic shift value 0 is applied and the sequence to which a predetermined allocation cyclic shift value is applied.

For example, if a cyclic shift value 3 is allocated to data corresponding to three times of the preamble sequence length, the cyclic shift value 0 can be applied to the first and third sequence blocks, and the cyclic shift value 3 can be applied to the second sequence block. Alternatively, the cyclic shift value 3 can be applied to the first and third sequence blocks, and the cyclic shift value 0 can be applied to the second sequence block.

Hereinafter, the detailed embodiment of the aforementioned cases will be described.

Embodiment 1

It is considered that the number of codes/sequences to be applied at a system bandwidth of 5 MHz is 64 (K=64) and the number of data carriers is 288 and the number of pilots is 144. In this case, the macro base station can allocate one or more of 64 different sequences of a length 144 to each femto base station in accordance with a previously defined mode.

At this time, the femto base station can allocate the preamble sequence either repeatedly or by applying cyclic shift to the preamble sequence. At this time, cyclic shift values for the repeated sequences may be different from one another. For example, the cyclic shifted preamble sequences can be configured by junction of the cyclic-shifted sequence of the cyclic shift value 0 and the cyclic-shifted sequence of the cyclic shift value 3.

In another aspect of the present invention, the sequence for all lengths (useful subcarrier size) of preamble and data is generated, and a method for applying the generated sequence to preamble and data will be described.

First of all, the macro base station and each femto base station know base sequences for all useful bands, and know base sequences and cyclic shift values, respectively, in accordance with a previously defined rule. At this time, the cyclic shift value may be one of K number of codes/sequences. A plurality of cyclic shift values may be allocated as the case may be. The generated K number of different codes/sequences can be used to identify each femto base station and also can be used to scramble data.

At this time, the sequences allocated to the femto base station can be applied to preamble and data in accordance with one of three methods below. First, the sequences allocated to the femto base station can sequentially be applied to preamble and data. Second, the sequences allocated to the femto base station can be applied to preamble and data in the cyclic shift order by using the same cyclic shift value as that of sequence index known by each femto base station. Third, a separate cyclic shift value different from the cyclic shift value for the sequence index previously defined between each femto base station and the macro base station can be applied to preamble and data in accordance with the corresponding order.

Hereinafter, the detailed embodiment of the aforementioned aspect of the present invention will be described.

Embodiment 2

If the number of codes/sequences to be applied at a system bandwidth of 5 MHz is 64 (K=64), orthogonal sequences or quasi-orthogonal sequences for the length 432 can be generated. Examples of the orthogonal sequences include discrete fourier transform (DFT) sequences and hadamard sequences. Examples of the quasi-orthogonal sequences include constant amplitude zero autocorrelation (CAZAC) sequences and Zadoff-Chu (ZC) sequences. Each femto base station can be allocated a part of 64 different sequences generated as above.

At this time, if one femto base station knows the sequence generated for the sequence of the length 432 using the cyclic shift value 3, the sequences can be applied to preamble and data in accordance with one of three methods below.

First, the corresponding sequences can sequentially be applied to preamble and data. Second, the sequences can be applied to preamble and data in the cyclic shift order by using the same cyclic shift value 3 as that of sequence index (for example, index=3) already known by each femto base station. Third, a separate cyclic shift value (for example, index=1) different from the cyclic shift value for the sequence index previously defined between each femto base station and the macro base station can be applied to preamble and data in accordance with the corresponding order.

As described above, according to the present invention, data scrambling effect can be obtained effectively by small memory capacity, and the femto base station can be detected efficiently.

Figure 8:
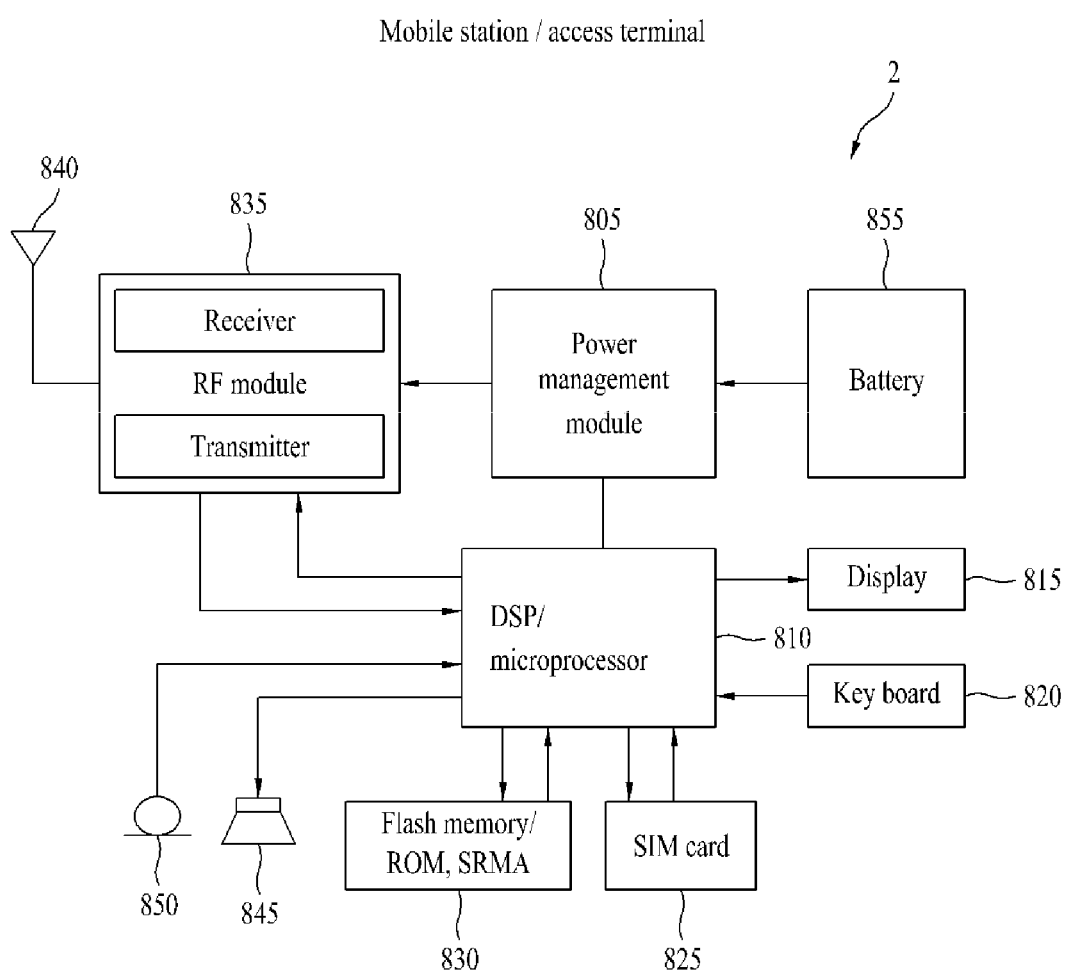
FIG. 8 is a block diagram illustrating an example of a structure of a mobile station or access terminal.

FIG. 8 is a block diagram illustrating an example of a structure of a mobile station or access terminal.

Referring to FIG. 8, the mobile station includes a processor (or digital signal processor) 110, a radio frequency (RF) module 135, a power management module 105, an antenna 140, a battery 155, a display 115, a key pad 120, a memory module 130, a subscriber identification module (SIM) card 125 (SIM card may be option), a speaker 145, and a microphone 150.

A user inputs indication information such as phone number by pushing the key pad 120 button or through audio activation using the microphone 150, for example. The microprocessor 110 performs a suitable function such as phone number dialing by receiving and processing the indication information. The microprocessor can perform the function by obtaining action data from the SIM card 125 or the memory module 130. Also, for reference and convenience of the user, the microprocessor 110 can display indication and action information in the display 115.

The microprocessor 110 can initiate communication such as transmission of a radio signal including audio communication data by transferring the indication information to the RF module 135. The RF module 135 includes a receiver and a transmitter for reception and transmission of a radio signal. The antenna 140 facilitates transmission and reception of the radio signal. If the radio signal is received, the RF module 135 can transfer the signal and convert the same to a baseband for the microprocessor 110.

The processed signal is converted to audible or readable information through the speaker 145. The microprocessor 110 includes a protocol and function required to perform various procedures described in this specification.

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention can be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

It will be apparent that some claims referring to specific claims may be combined with another claims referring to the other claims other than the specific claims to constitute the embodiment or add new claims by means of amendment after the application is filed.

Various embodiments will be described as the best mode for carrying out the present invention.

The method for enabling a mobile station to efficiently detect and search for a femto base station according to the present invention can be utilized in a variety of industrial fields.

The invention claimed is:

1. A method for searching for a femto base station, the method comprising:
   receiving a preamble and data, wherein the preamble comprises a partial part of identification information of the femto base station and the data comprises a residual part of the identification information of the femto base station; and
   searching for the femto base station by identifying the femto base station based on the identification information received through the preamble and the data,
   wherein a sequence of the preamble ("preamble sequence") is reused as a scrambling sequence for scrambling the data, and
   wherein a portion of the preamble sequence which is reused for scrambling the data is determined by comparing the length between the preamble sequence and a sequence of the data ("data sequence").

2. The method of claim 1, wherein if the preamble sequence is longer than the data sequence, a number of Least Significant Bits of the preamble sequence corresponding to the length of the data sequence or a number of Most Significant bits of the preamble sequence corresponding to the length of the data sequence are defined as the scrambling sequence for scrambling the data.

3. The method of claim 1, wherein if the preamble sequence is equal to or shorter than the data sequence, the entirety of the preamble sequence is reused as the data scrambling sequence, or a cyclic shift value, which is previously defined, is applied to the preamble sequence, so that the entirety of the cyclic-shifted preamble sequence is reused as the data scrambling sequence.

4. The method of claim 1, wherein, when the data sequence has the length corresponding to a predetermined integer multiple of the length of the preamble sequence, the entirety of the preamble sequence is repeatedly applied as much as the predetermined integer multiple or repeatedly applied per preamble sequence element, so that the preamble sequence is reused as the data scrambling sequence.

5. The method of claim 4, wherein the entirety of the preamble sequence is repeatedly applied or the preamble sequence repeatedly applied per preamble sequence element is cyclic shifted, so that the preamble sequence is reused as the data scrambling sequence.

6. The method of claim 4, wherein the cyclic shifted preamble sequence is configured by block unit combination of a sequence to which a cyclic shift value corresponding to a previously defined basic value is applied and a sequence to which a separately allocated predetermined cyclic shift value is applied.

7. The method of claim 1, wherein the partial part of the identification information comprises at least one of a portion of base station (BS) identity (ID), a portion of closed subscriber group (CSG) ID, a portion of cell ID and a portion of sector ID, and the residual part of the identification information comprises at least one of remained portion of BS ID, remained portion of CSG ID, remained portion of cell ID and remained portion of sector ID.

* * * * *